United States Patent
Mallmann et al.

(10) Patent No.: US 8,671,604 B2
(45) Date of Patent: Mar. 18, 2014

(54) MARKING CARRIER FOR MARKING A FLOATING CALIPER BRAKE

(75) Inventors: Markus Mallmann, Pfalzfeld (DE); Maria Heinemann, Sinzig (DE); Stefan Krebs, Koblenz (DE); Peter Stahl, Bad Neuenahr-Ahrweiler (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 13/991,734

(22) PCT Filed: Nov. 15, 2011

(86) PCT No.: PCT/EP2011/005751
§ 371 (c)(1),
(2), (4) Date: Jul. 22, 2013

(87) PCT Pub. No.: WO2012/076112
PCT Pub. Date: Jun. 14, 2012

(65) Prior Publication Data
US 2013/0291418 A1    Nov. 7, 2013

(30) Foreign Application Priority Data
Dec. 9, 2010  (DE) .......................... 10 2010 053 910

(51) Int. Cl.
*G09F 3/16*    (2006.01)
*B60R 13/00*   (2006.01)

(52) U.S. Cl.
CPC .. *G09F 3/16* (2013.01); *B60R 13/00* (2013.01)
USPC .............................. 40/666; 40/643; 188/73.31

(58) Field of Classification Search
CPC ... G09F 3/16; F16D 2055/0037; B60R 13/00; B60R 13/005
USPC .......... 40/643, 644, 666, 663, 587; 188/73.31
See application file for complete search history.

(56) References Cited

U.S. PATENT DOCUMENTS

| | | | |
|---|---|---|---|
| 7,144,142 B1 * | 12/2006 | Suarez .......................... | 362/500 |
| 7,849,982 B1 * | 12/2010 | Tamura et al. ............ | 188/250 G |
| 8,276,718 B2 | 10/2012 | Bach et al. | |
| 2004/0074716 A1 * | 4/2004 | Brumfield et al. ........ | 188/218 A |
| 2005/0091897 A1 * | 5/2005 | Lawrence ....................... | 40/666 |
| 2009/0141514 A1 * | 6/2009 | Palkovic ....................... | 362/509 |
| 2009/0152056 A1 * | 6/2009 | Heinz et al. .................. | 188/72.5 |
| 2009/0321198 A1 * | 12/2009 | Barland .................... | 188/264 A |

(Continued)

FOREIGN PATENT DOCUMENTS

| | | |
|---|---|---|
| DE | 10027783 A1 | 1/2002 |
| DE | 4101514 C2 | 3/2002 |
| DE | 102004043307 A1 | 6/2005 |
| DE | 102006020282 A1 | 10/2007 |

(Continued)

*Primary Examiner* — Gary Hoge
(74) *Attorney, Agent, or Firm* — MacMillan, Sobanski & Todd, LLC

(57) ABSTRACT

For a marking carrier, the following is provided for the purpose of simple production and installation: the marking carrier has at least one spring tongue extending from the main body of the marking carrier, the spring tongue being designed to act on the vehicle component in a resilient manner and to preload the main body against the vehicle component in a preloading direction, and the marking carrier has at least one spring tab, which acts on the vehicle component in such a way that the spring tab retains the marking carrier in a retaining direction opposite the preloading direction.

16 Claims, 6 Drawing Sheets

(56) References Cited

U.S. PATENT DOCUMENTS

2010/0032393 A1\* 2/2010 Nikols .................. 211/85.4
2012/0181125 A1\* 7/2012 Holt ..................... 188/219.1
2013/0227867 A1\* 9/2013 Furber ................... 40/666

FOREIGN PATENT DOCUMENTS

| | | |
|---|---|---|
| DE | 102007001731 A1 | 2/2008 |
| DE | 102007033165 A1 | 5/2008 |
| EP | 1146245 A2 | 10/2001 |

\* cited by examiner

MARKING CARRIER FOR MARKING A FLOATING CALIPER BRAKE

CROSS-REFERENCE TO RELATED APPLICATIONS

This application is a national stage of International Application No. PCT/EP2011/005751 filed Nov. 15, 2011, the disclosures of which are incorporated herein by reference in entirety, and which claimed priority to German Patent Application No. DE 10 2010 053 910.4 filed Dec. 9, 2010, the disclosures of which are incorporated herein by reference in entirety.

BACKGROUND OF THE INVENTION

The present invention relates to a marking carrier for marking a vehicle component, in particular a component of a floating caliper brake.

The marking carrier according to the invention can be attached in particular to a brake caliper of a floating caliper brake for a motor vehicle, in order, for example, to show the brake type, the brake manufacturer or the vehicle manufacturer. Marking carriers of this kind are used to visually enhance the individual vehicle component, in particular the brake caliper, since the latter is frequently visible from outside through the wheel rims of the vehicle. Specifically, the marking carrier according to the invention comprises a plane main body, to which a marking is applied or can be applied, and fastening means for detachably fastening the marking carrier to the vehicle component, the fastening means being formed integrally with the marking carrier and being lastingly firmly clampable to the vehicle component while avoiding aids.

A marking carrier of this kind is known, for example, from the document DE 41 01 514 C2. In this prior art, the marking carrier is firmly clamped by suitable latching or clamping means directly to projections, springs or in cutouts which are provided on the brake pads or other components of the brake. In particular, the firm clamping to the brake pads has the disadvantage, however, that the latter are moved on each brake actuation and may be subjected partially to strong vibrations, which may have an adverse effect on a durable fastening of the marking carriers. It has turned out that the latching or clamping means shown in this document are susceptible to loss of the respective marking carrier.

Furthermore, the document DE 100 27 783 A1 shows a brake caliper of a disc brake, to which caliper a marking carrier is fastened by means of additional grooved drive studs. Although this prior art enables a reliable and durable fastening of the marking carrier, the mounting of the additional grooved drive studs is laborious and costly. Moreover, a removal of the marking carrier due to maintenance necessitates destructive removal of the grooved drive studs, which is regarded as a disadvantage.

The document EP 1 146 245 A2 describes a cover for the marking of individual components of a brake system. This cover is, on the one hand, clamped via suitable means to the respective vehicle component. Additionally, provision is made for screwing on the cover by means of suitable bolts as well. In this system too, the mounting and removal of the marking carrier due to maintenance is laborious.

BRIEF SUMMARY OF THE INVENTION

It is a feature of the present invention to provide a marking carrier of the kind described at the outset which is easily mountable on the vehicle component, in operation remains durably on the vehicle component even under external mechanical influences and can be removed from the vehicle component with little effort.

This feature is achieved by a marking carrier which has at least one spring tongue extending from its main body, which spring tongue is designed to engage on the vehicle component resiliently and to bias the main body against the vehicle component in a biasing direction, and in that the marking carrier has at least one spring tab, which engages on the vehicle component in such a way that the spring tab retains the marking carrier in a retaining direction opposite the biasing direction.

According to the invention, it is provided that the marking carrier is securely retained on the vehicle component, in particular the brake caliper, by the at least one spring tongue and the at least one spring tab acting in the opposite direction. This takes place solely by the interaction of the at least one spring tongue and the at least one spring tab with the vehicle component without additional aids, such as for example screws, grooved drive studs, rivets or the like. The durable connection to the vehicle component is brought about by the spring forces, which additionally result in the marking carrier remaining firmly adhering to the vehicle component even under external mechanical influences occurring due to operating conditions, such as for example vibrations or shaking. On the other hand, the fastening allows, solely by means of spring action, a relatively easy detachment of the marking carrier from the vehicle component. The main body may be configured with any desired geometry in order thus to enable individualisation of the vehicle component, for example by putting on the manufacturer's logo or other information.

A development of the invention provides that the at least one spring tongue, starting from the main body, is of rounded, for example bulging or arc-shaped or else wave-shaped, form and at its free end is provided with an abutment section, the spring tongue being resiliently supported with its abutment section on the vehicle component under compression of the rounding or wave shape. A sufficiently large spring force for the biasing can be built up, as required, via the rounding or wave shape and the compression thereof. In particular, in connection with a wave-shaped design, it may be provided that the at least one spring tongue has a double-S shape. The rounded or wave-shaped design gives rise to particularly good resilience properties with little outlay on production. In order to provide a defined abutment surface with retaining function, a development of the invention provides that the abutment section of the at least one spring tongue is of rectilinear form or concavely curved towards the vehicle component.

In order to further improve the fastening between marking carrier and vehicle component, a development of the invention provides that the marking carrier is provided with at least one retaining tab, which engages around the vehicle component in a retaining manner. Preferably, it is provided here that the retaining tab is provided with a contact impression. The contact impression may form a spherical surface section, via which it comes into contact with a corresponding surface of the vehicle component. As a result, a defined abutment for achieving a desired biasing against a detachment or shaking of the marking carrier is obtained.

According to one embodiment variant of the invention, it is possible for the spring tab to start from the same lateral surface of the main body. Furthermore, the at least one spring tab may extend substantially parallel to the direction in which the rounding extends or to the wave direction of the at least one spring tongue beyond the length of the at least one spring tongue. In other words, in this embodiment variant the at least one spring tab runs in a direction parallel to the at least one spring tongue, but extends beyond the latter.

To produce the opposed forces via the spring tab, it may be provided according to the invention that the spring tab has a retaining projection, with which it engages on a corresponding retaining formation of the vehicle component. The retaining formation here may be, for example, of round, angular or oval shape. In this case, the retaining formation may be produced already in advance during the casting process or by subsequent machining or cold forming. The retaining projection may, for example, comprise a lug or a material portion which extends, starting from the spring tab, tooth-like at a predetermined angle.

In a special embodiment variant of the invention, it is provided that the spring tab is formed substantially centrally on the main body, with respectively one spring tongue extending on either side of the spring tab and at a distance therefrom. Furthermore, with regard to a stable configuration of at least one spring tab and at least one spring tongue, it is possible that the spring tab is formed substantially wider than, preferably at least twice as wide as, the at least one spring tongue.

Furthermore, in a development of the invention, it may be provided that the at least one spring tongue and the spring tab extend substantially on a side facing away from the marking.

The invention further relates to a vehicle component, in particular brake caliper of a floating caliper brake, for receiving a marking carrier of the kind described above, in which the vehicle component has a fastening attachment, onto which the main body of the marking carrier can be fitted, the at least one spring tongue engaging on an end side of the fastening attachment, and the spring tab engaging around the fastening attachment. The fastening attachment may, for example, be formed in a manner corresponding to the dimensions of the main body of the marking carrier or be specially adapted for the interaction of spring tab and spring tongue. Preferably, the fastening attachment is formed directly on the vehicle component. Alternatively, the fastening attachment may also be formed from a separate component, e.g. a sheet-metal shaped part, which is subsequently fastened to the vehicle component in a force-locking or form-locking manner, for example. Thus, the fastening attachment may, for example, comprise or engage around a part of the vehicle component.

In this connection, it may further be provided that the fastening attachment has a central cutout in which the fastening projection engages in a retaining manner.

Other advantages of this invention will become apparent to those skilled in the art from the following detailed description of the preferred embodiments, when read in light of the accompanying drawings.

DETAILED DESCRIPTION OF THE INVENTION

Figure 1:
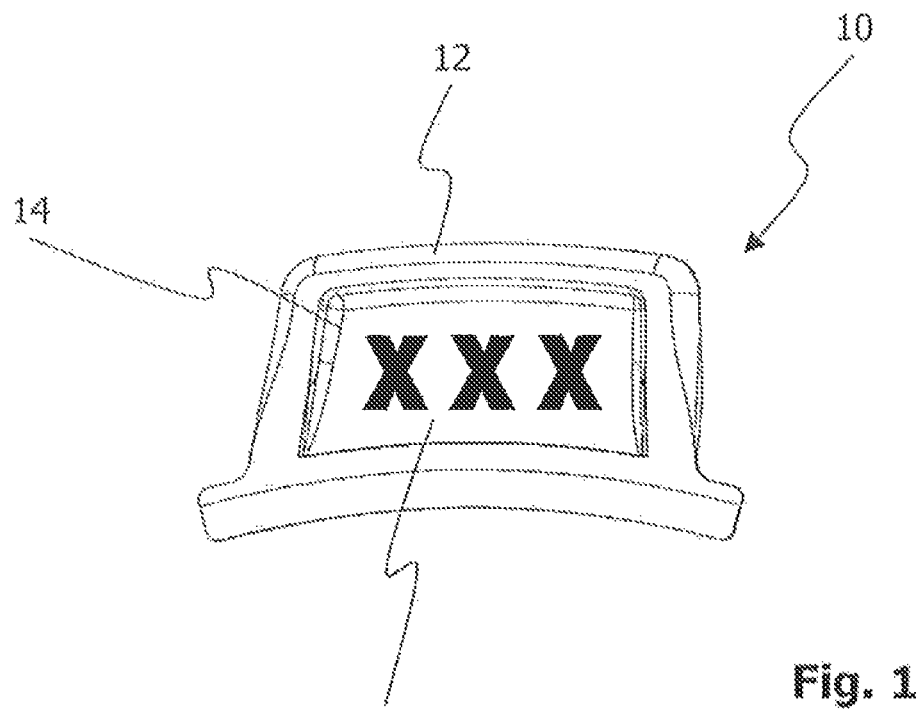
FIG. 1 shows a front view of the marking carrier according to the invention.
Figure 2:
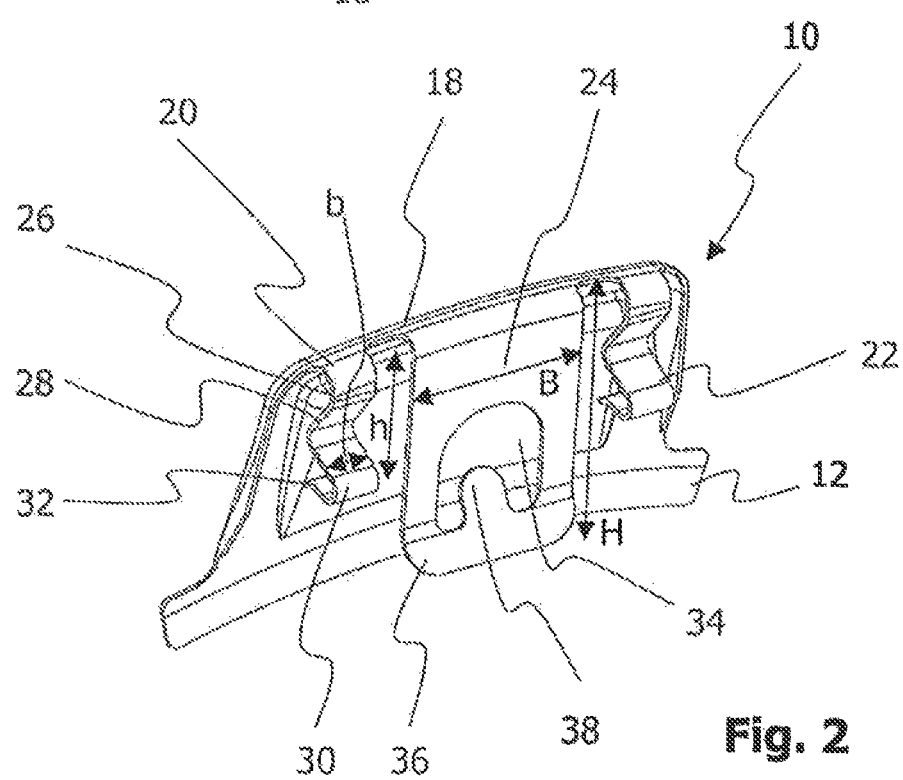
FIG. 2 shows a three-dimensional rear view of the marking carrier according to the invention.

A marking carrier according to the invention is shown in the front view and the rear view in FIGS. 1 and 2 and generally denoted by 10. The marking carrier comprises a plane main body 12, in which an indentation 14 is incorporated. A marking 16, indicated by the letters "XXX" in the figure, is applied in this indentation. This marking may be a manufacturer's name, a manufacturer's logo or other information. The marking here may be applied to the marking carrier directly by means of a printing, laser, painting, embossing or sandblasting technique or indirectly by means, for example, of a sticker or emblem.

In the rear view according to FIG. 2, it can be seen that two spring tabs 20, 22 and an elongated spring tongue 24 are formed on the main body 12 of the marking carrier 10 at the upper edge 18 of the latter. The two spring tabs 20, 22 are substantially identical in their shape, so that only the spring tab 20 is described. This tab extends, starting from the upper edge 18, with a rounding 26 rounded with substantially constant curvature in a wave shape, to a wave trough 28 and, starting from the latter, to a wave projection 30 again. Starting from this wave projection 30, the spring tab 20 extends to its free end 32, which is curved in a concave shape. The spring tab 20, 22 has a width b and a height h in the relaxed state.

The spring tongue 24 is arranged approximately centrally on the marking carrier 10 at a clear distance from the spring tab 20. This spring tongue 24 extends substantially rectilinearly in the same direction as the spring tab 20 downwards, but with a greater length H and substantially greater width B, in the embodiment shown substantially twice the height (H=2*h) and four times the width (B=4*b) compared with the height and width of the spring tab 20. The spring tongue 24 comprises a central opening 34 and a free end 36 angled slightly away from the main body. A projection 38, which is formed with a rounded contour and is angled inwardly towards the main body 12, projects into the central opening 34.

Figure 3:
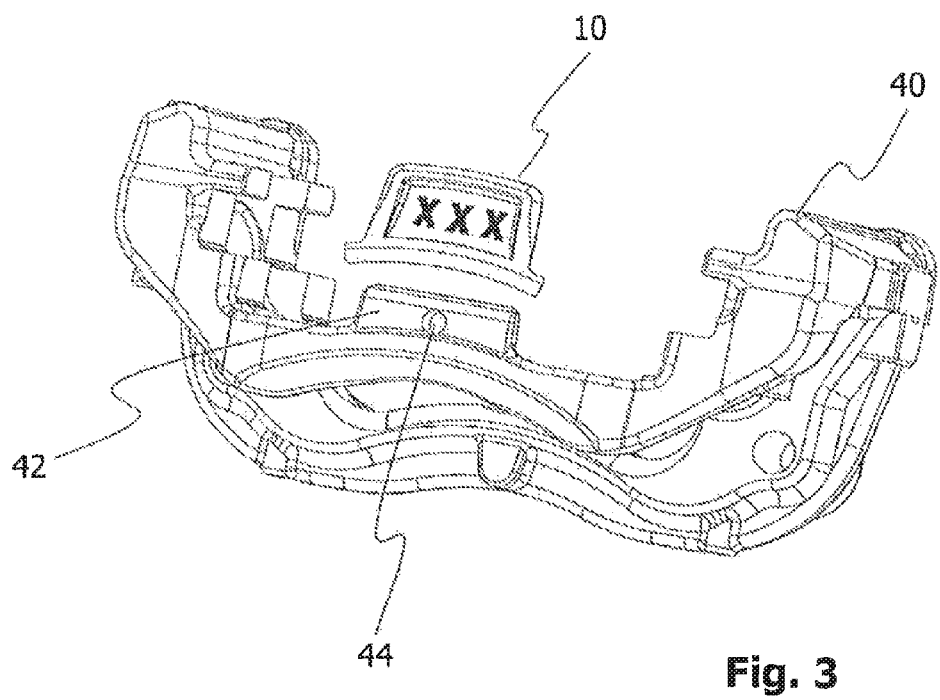
FIG. 3 shows a three-dimensional front view on the mounting of the marking carrier according to the invention on a brake caliper.
Figure 4:
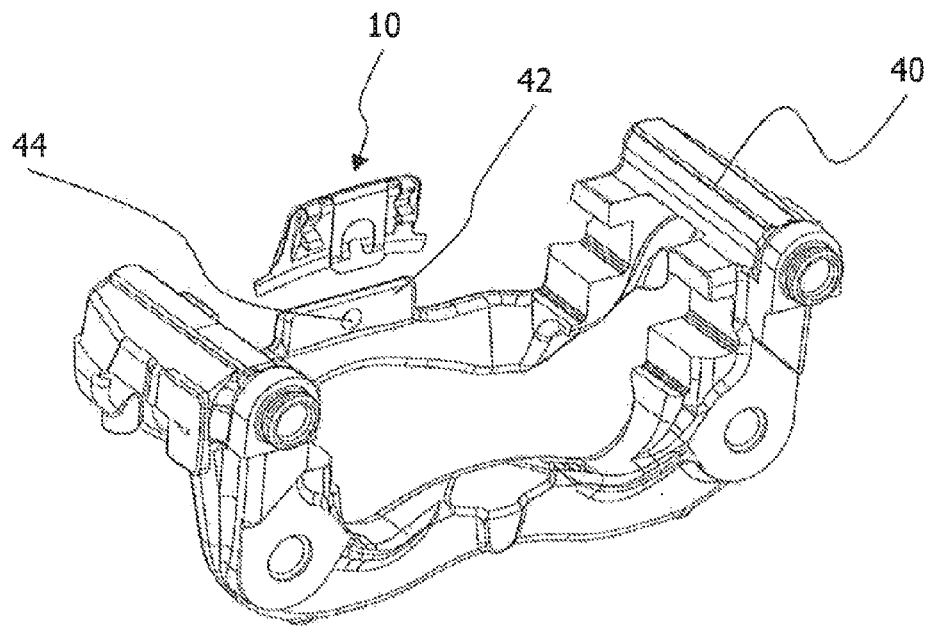
FIG. 4 shows a three-dimensional rear view of FIG. 3.

FIGS. 3 and 4 show a brake caliper 40 of a floating-caliper disc brake having a design conventional per se. This brake caliper 40 is, however, provided with a fastening attachment 42 which is integrally arranged on the brake caliper 40. This fastening attachment 42 has a central opening 44. The fastening attachment 42 serves to fasten the marking carrier 10 to the brake caliper 40. FIGS. 3 and 4 show a premounting state of the marking carrier 10.

Figure 5:
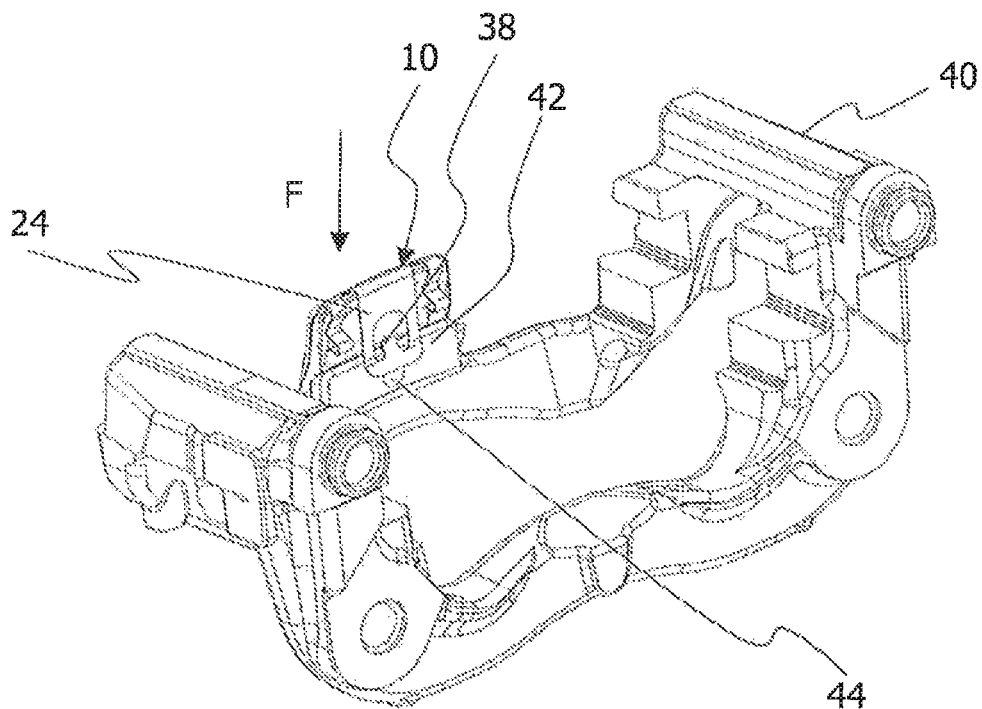
FIG. 5 shows a three-dimensional rear view during the mounting shortly before reaching the end position.

In FIG. 5, the marking carrier 10 has already been fitted onto the fastening attachment 42, but not yet fully locked to it. In particular, the projection 38 does not yet project into the central opening 44 on the fastening attachment 42.

Figure 6:
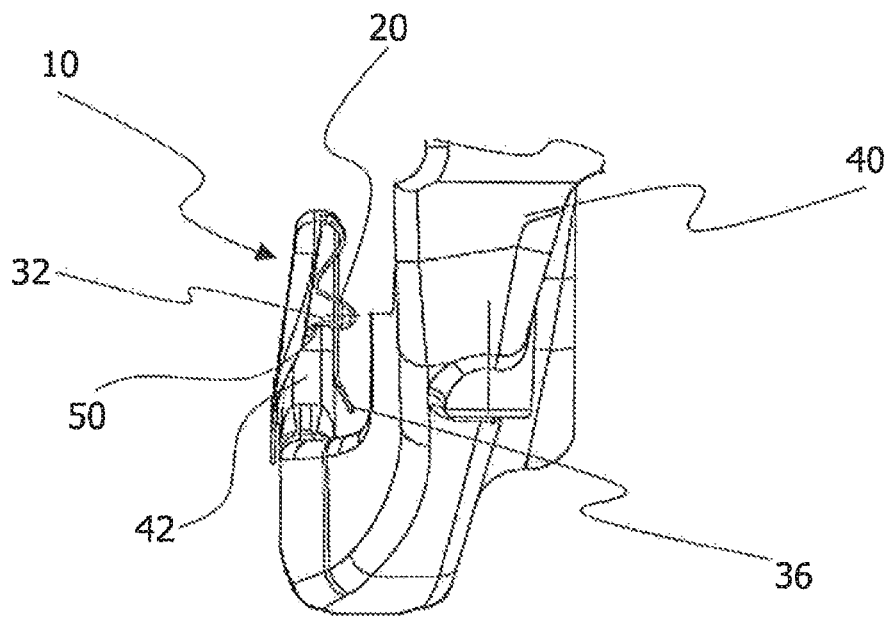
FIG. 6 shows a side view of a detail of the brake caliper according to the invention with the marking carrier fully mounted.
Figure 7:
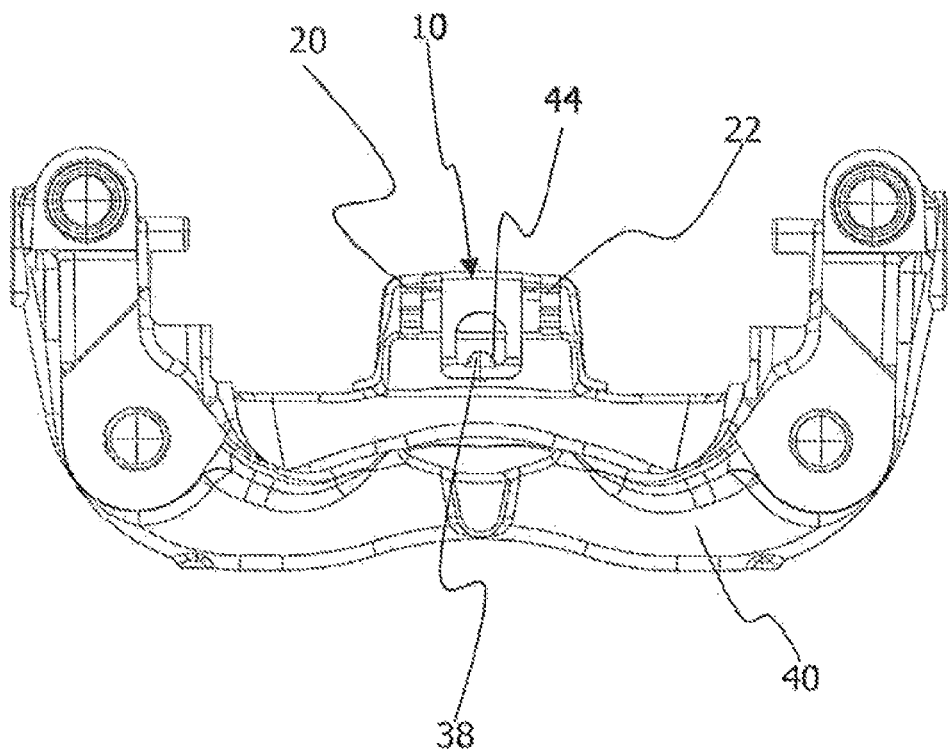
FIG. 7 shows a rear view of the state according to FIG. 6.
Figure 8:
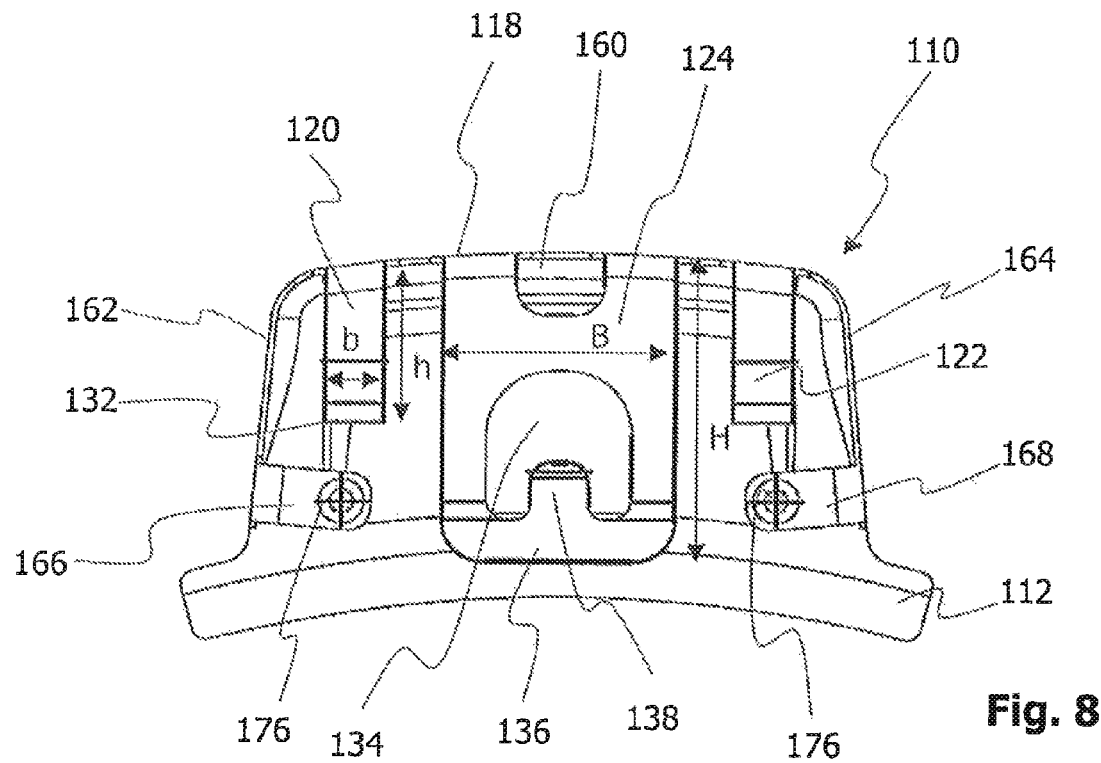
FIG. 8 shows a rear view of a marking carrier according to a second embodiment of the invention.
Figure 9:
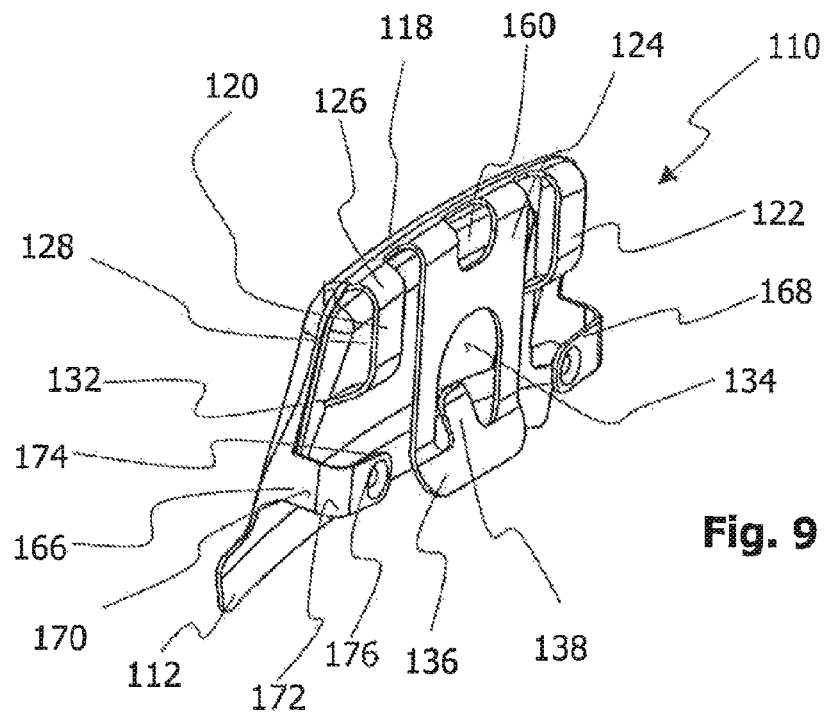
FIG. 9 shows a perspective view of the marking carrier according to FIG. 8.
Figure 10:
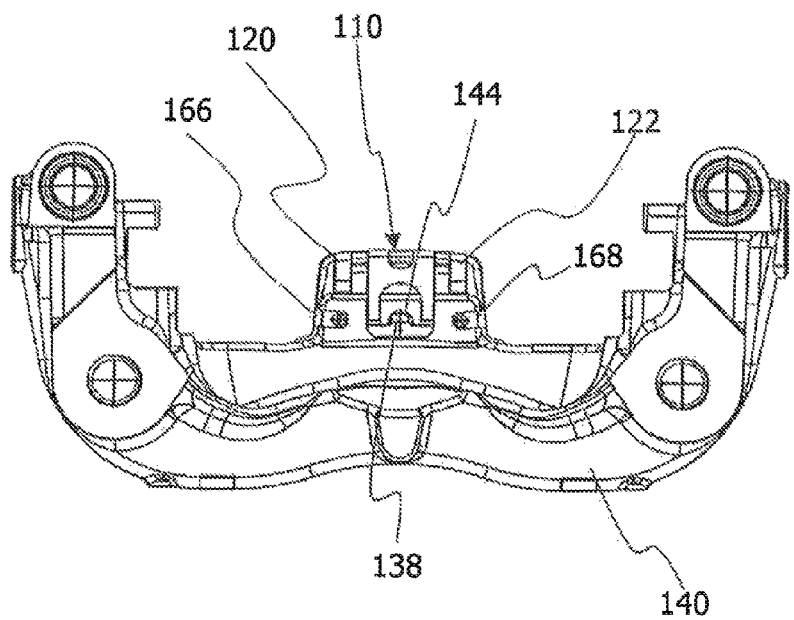
FIG. 10 shows a view corresponding to FIG. 7 with the marking carrier according to the second embodiment.

FIGS. 6 and 7, finally, show the marking carrier 10 in the mounted state, in which it is attached to the brake caliper 40. Here, it can be seen how the spring tab 20 is formed in its curved shape and rests with its concavely shaped free end 32 on the upper edge 50 of the fastening attachment 42. In the context of the mounting, the marking carrier 10 is pushed downwards with a certain mounting force F (see FIG. 5), during which the two spring tabs 20, 22 are vertically compressed and resiliently deformed until finally the projection 38 of the spring tongue 24 is able to snap into the central opening 44 of the fastening attachment 42. In doing so, the projection 38 with its rounded shape cooperates with the rounded central opening 44 of the fastening attachment 42 in a positioning manner, so that the marking carrier 10 assumes a predetermined desired position relative to the brake caliper 40. In the context of the mounting, the marking carrier 10 can then be released and the state as shown in FIGS. 6 and 7 results.

In the mounted state, owing to the compression of the double-S-shaped spring tabs 20, 22, the marking carrier 10 is biased in the vertical direction upwards (biasing direction) in FIGS. 6 and 7, but retained via the projection 38 in the opposite direction downwards (retaining direction), the projection 38 engaging in the opening 44. Owing to the spring biasing of the spring tabs 20, 22, a state of tension results which retains the marking carrier 10 firmly on the fastening attachment 42, even if vibrations occur on the brake caliper 40 in operation. On the other hand, the marking carrier 10 can be easily removed from the brake caliper 40 by pushing the marking carrier 10 downwards a little, whereby the biasing in the spring tabs 20, 22 is increased, and subsequently the spring tongue 24 can be swung away from the fastening attachment 42 in such a way that the projection 38 becomes disengaged from the central opening 44 and thus the marking carrier 10 can be pulled off upwards without resistance.

A second embodiment of the invention is illustrated in FIGS. 8 to 12. To simplify the description and avoid repetitions, for components which are of the same kind or have the same effect, the same reference symbols are used as in the embodiment described with reference to FIGS. 1 to 7, but prefixed with the numeral "1".

The marking carrier 110 modified with respect to the first embodiment has spring tabs 120, 122 of a different form. These spring tabs are not of wave-shaped form, but extend, starting from the upper edge 118, in a bulging manner via the rounding 126 into a rectilinear section 128, and from there into an obliquely downward-running abutment section 132 forming the free end. In addition, the spring tongue 124 has an opening 160 in the region near its upper edge 118.

Figure 11:
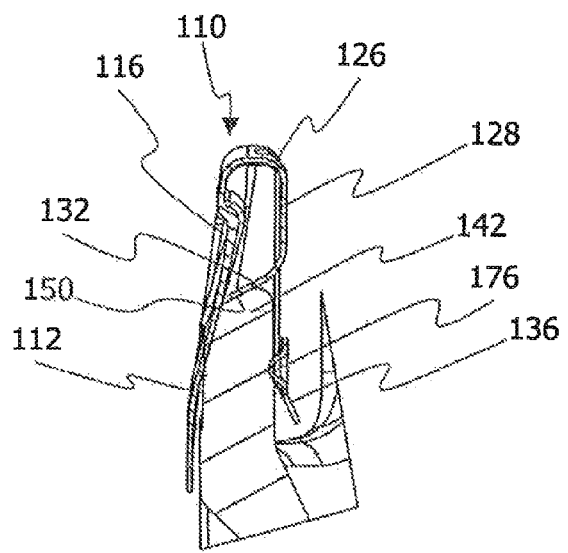
FIG. 11 shows a sectional view corresponding to section line XI-XI from FIG. 10.
Figure 12:
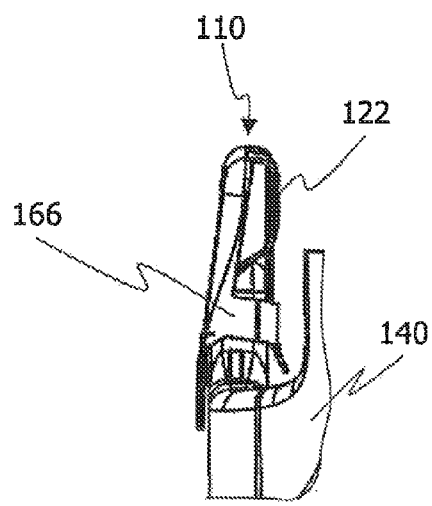
FIG. 12 shows a view corresponding to FIG. 6 of the marking carrier according to the second embodiment.

Furthermore, it can be seen that, starting from lateral edges 162, 164 of the main body 112, in each case one retaining tab 166, 168 extends. Each retaining tab 166, 168 has a rectilinearly running first section 170, a bend 172 and a second section 174 running substantially 90° to the first section 170. Provided in this second section 174 is a circular impression 176 which, as can be seen in FIG. 11, forms a spherical surface section facing the fastening attachment 142 and in the mounted state comes into defined abutment with the rear side of the fastening section 142. This defined abutment provides sufficient support for each retaining tab 166, 168 for spring biasing, so that shaking loose or rattling can be prevented. By virtue of the additional retaining tabs 166, 168, this second embodiment affords secure fastening of the marking carrier 110 on the fastening attachment 142.

In FIG. 11, it can further be seen that the rectilinear section 132 lies in defined plane abutment with the oblique surface section 150 facing it.

In both embodiments, it can be seen that the marking carrier is of substantially longer form in its height extent than the fastening attachment 42 and 142, respectively, serving for the fastening. The amount by which the marking carrier 10 and 110, respectively, extends beyond the fastening attachment 42 and 142, respectively, serves for building up a spring biasing via the spring tabs 20, 22 and 120, 122, respectively.

Overall, according to the present invention, a marking carrier is obtained which is easily mountable, securely retained on a vehicle component in operation and also easily demountable.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A marking carrier for attaching to a brake caliper comprising:
    a plane main body to which a marking is applied or can be applied, and
    fastening means for detachably fastening
    the marking carrier to the brake caliper, the fastening means being formed integrally with the marking carrier and being lastingly firmly clampable to the brake caliper while avoiding aids, wherein the marking carrier has at least one spring tongue extending from the main body, which spring tongue is designed to engage on the brake caliper resiliently and to bias the main body against the brake caliper in a biasing direction, and in that the marking carrier has at least one spring tab, which engages on the brake caliper in such a way that the spring tab retains the marking carrier in a retaining direction opposite the biasing direction.

2. The marking carrier according to claim 1, wherein the at least one spring tongue, starting from the main body, is of rounded form and at a free end thereof is provided with an abutment section, the at least one spring tongue being resiliently supported with the abutment section thereof on the brake caliper under compression of the rounded form.

3. The marking carrier according to claim 2, wherein the at least one spring tongue is of wave-shaped form.

4. The marking carrier according to claim 2, wherein the at least one spring tongue is of bulging rounded form.

5. The marking carrier according to claim 2, wherein the abutment section is of rectilinear form or concavely curved towards the brake caliper.

6. The marking carrier according to claim 3, the at least one spring tab starts from a same lateral surface of the main body and extends substantially parallel to a wave direction of the at least one spring tongue beyond a length of the at least one spring tongue.

7. The marking carrier according to claim 1,
    further including at least one retaining tab, which engages around the brake caliper in a retaining manner.

8. The marking carrier according claim 7,
    wherein the at least one retaining tab is provided with a contact impression.

9. The marking carrier according to claim 1, wherein the at least one spring tongue has a double-S shape.

10. The marking carrier according to claim 1, wherein the at least one spring tab has a retaining projection which engages on a corresponding retaining formation of the brake caliper.

11. The marking carrier according to claim 1, wherein the spring tab is formed substantially centrally on the main body, with respectively one spring tongue extending on either side of the spring tab.

12. The marking carrier according to claim 1, wherein the at least one spring tab is formed wider than the at least one spring tongue.

13. The marking carrier according to claim 1, wherein the at least one spring tongue and the at least one spring tab extend substantially on a side facing away from the marking.

14. A brake caliper for receiving a marking carrier according to claim 1,
   wherein the brake caliper has a fastening attachment, onto which the main body of the marking carrier is configured to be fitted, the at least one spring tongue engaging on an end side of the fastening attachment, and the at least one spring tab engaging around the fastening attachment.

15. The brake caliper according to claim 14,
   wherein the fastening attachment has a retaining formation which is formed as a central cutout and in which a retaining projection of the at least one spring tab engages in a retaining manner.

16. The vehicle component according to claim 15,
   wherein the retaining formation is of round, circular, oval, or angular form.

\* \* \* \* \*